United States Patent
Lee et al.

(10) Patent No.: US 9,392,653 B2
(45) Date of Patent: Jul. 12, 2016

(54) ORGANIC LIGHT EMITTING DISPLAY DEVICE

(75) Inventors: Hee-Chul Lee, Yongin-si (KR); Min-Weun Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 187 days.

(21) Appl. No.: 13/591,538

(22) Filed: Aug. 22, 2012

(65) Prior Publication Data

US 2013/0113773 A1    May 9, 2013

(30) Foreign Application Priority Data

Nov. 3, 2011  (KR) .................. 10-2011-0114078

(51) Int. Cl.
*G06F 3/038* (2013.01)
*H05B 33/08* (2006.01)

(52) U.S. Cl.
CPC ............ *H05B 33/0815* (2013.01); *G06F 3/038* (2013.01); *Y02B 20/341* (2013.01)

(58) Field of Classification Search
CPC ....................................................... G09G 3/30
USPC ................................................. 345/76, 204
See application file for complete search history.

(56) References Cited

U.S. PATENT DOCUMENTS

| | | | |
|---|---|---|---|
| 7,106,285 B2 * | 9/2006 | Naugler | 345/87 |
| 2005/0116657 A1 | 6/2005 | Park et al. | |
| 2006/0022911 A1 * | 2/2006 | Satoh | G09G 3/3216 345/76 |
| 2008/0007234 A1 * | 1/2008 | Agari | 323/282 |
| 2008/0122758 A1 * | 5/2008 | Kim et al. | 345/76 |
| 2008/0143655 A1 * | 6/2008 | Ko | 345/82 |
| 2008/0198183 A1 * | 8/2008 | Min | G09G 3/3696 345/691 |
| 2010/0220039 A1 * | 9/2010 | Park et al. | 345/76 |

FOREIGN PATENT DOCUMENTS

| | | |
|---|---|---|
| KR | 10-0570994 | 4/2006 |
| KR | 10-0590241 | 6/2006 |
| KR | 10-2008-0055290 A | 6/2008 |

OTHER PUBLICATIONS

Korean Patent Abstract No. 10-2003-0084784 A, published Nov. 1, 2003 for KR 10-0570994, 1page.
Korean Patent Abstract No. 10-2006-0038867 A, published May 4, 2006 for KR 10-0590241, 1 page.

* cited by examiner

*Primary Examiner* — Grant Sitta
(74) *Attorney, Agent, or Firm* — Lewis Roca Rothgerber Christie LLP

(57) ABSTRACT

An organic light emitting display device includes a display panel including an organic light emitting diode, a power supply including a DC-DC converter that generates a driving voltage for the organic light emitting diode and that provides the driving voltage to the display panel, the DC-DC converter including an inductor and a switch, and an over-current prevention unit that blocks supply of the driving voltage when a value of a current flowing through the inductor is greater than a reference value.

18 Claims, 12 Drawing Sheets

ORGANIC LIGHT EMITTING DISPLAY DEVICE

CROSS-REFERENCE TO RELATED APPLICATION

This application claims priority under 35 USC §119 to and the benefit of Korean Patent Applications No. 10-2011-0114078, filed on Nov. 3, 2011 in the Korean Intellectual Property Office (KIPO), the contents of which are incorporated herein in its entirety by reference.

BACKGROUND

1. Field

Example embodiments relate generally to an organic light emitting display device.

2. Description of Related Art

Recently, an organic light emitting display device is widely used as a flat panel display device. Generally, the organic light emitting display device displays an image by using an organic light emitting diode (OLED) that generates light based on re-combinations of electrons and holes.

Since the organic light emitting display device displays an image without a backlight unit, the organic light emitting display device has many features such as low power consumption, high response speed, wide viewing angle, high contrast ratio, etc.

An organic light emitting diode includes an anode, a cathode, and an organic light emitting layer that is formed between the anode and the cathode. Generally, excitons are generated when electrons injected from the cathode and holes injected from the anode are re-combined within the organic light emitting layer. Here, since the excitons emit energy, light can be generated in the organic light emitting diode. In order to improve an efficiency of light emission, the organic light emitting layer may have a multi-layer structure including an emission layer (EML), an electron transport layer (ETL), and a hole transport layer (HTL). In addition, the multi-layer structure may further include an electron injection layer (EIL) and a hole injection layer (HIL).

The organic light emitting diode may operate using a pixel voltage corresponding to a pixel image signal and driving voltages ELVDD and ELVSS. Hence, data-lines, voltage-lines, and electrodes for the pixel voltage and the driving voltages ELVDD and ELVSS may be formed in a display panel.

However, a short circuit may be caused among the data-lines, the voltage-lines, and the electrodes in the display panel. In this case, an over-current may be generated between the display panel and a power supply unit that provides the driving voltages ELVDD and ELVSS. The over-current may result in serious damages (e.g., degradation (or burning) of the organic light emitting diode) to the display panel.

SUMMARY

Some example embodiments provide an organic light emitting display device capable of protecting an organic light emitting diode by preventing an over-current from flowing between a power supply unit (e.g., power supply) and a display panel.

According to some example embodiments, an organic light emitting display device includes a display panel including an organic light emitting diode, a power supply including a DC-DC converter that generates a driving voltage for the organic light emitting diode and that provides the driving voltage to the display panel, the DC-DC converter including an inductor and a switch, and an over-current prevention unit that blocks supply of the driving voltage when a value of a current flowing through the inductor is greater than a reference value.

In example embodiments, the over-current prevention unit may include a detector that detects the current flowing through the inductor, a comparison unit that compares a value of the current flowing through the inductor with the reference value, and a block unit that blocks the supply of the driving voltage based on a comparison result generated by the comparison unit.

In example embodiments, the detector may be coupled to an output terminal of the inductor.

In example embodiments, the comparison unit may correspond to a comparator that outputs a signal having a logic high level or a logic low level based on the comparison result generated by the comparison unit.

In example embodiments, the organic light emitting display device may further include a controller that provides a power control signal to the power supply, the power control signal being used for allowing the supply of the driving voltage. Here, the block unit may block the power control signal based on the comparison result generated by the comparison unit, the block unit being located between the controller and the power supply.

In example embodiments, the block unit may shut-off a supply-line of the driving voltage based on the comparison result generated by the comparison unit, the block unit being located between the power supply and the display panel.

In example embodiments, the over-current prevention unit may further include a reference set unit that sets the reference value.

In example embodiments, the reference set unit may include a look-up table for storing a plurality of reference values that are suitable for a plurality of display panels, sizes of the display panels being different from one another, and a selection unit that selects and outputs one of the reference values.

In example embodiments, the selection unit may select one of the reference values based on a selection signal that is provided from outside.

In example embodiments, the over-current prevention unit may further include a counter that counts a voltage block signal that is output from the comparison unit when a value of the current flowing through the inductor is greater than the reference value, and that provides the voltage block signal to the block unit when a counted number is equal to a reference number, the counter being located between the comparison unit and the block unit.

In example embodiments, the counter may receive a count clock signal from outside, the count clock signal being used for controlling a count cycle.

In example embodiments, the organic light emitting display device may further include a scan driver that provides a scan signal to the display panel, a data driver that provides a data voltage to the display panel, and a controller that provides a scan control signal to the scan driver, that provides a data control signal and a data signal to the data driver, and that provides a power control signal to the power supply.

According to some example embodiments, an organic light emitting display device includes a display panel including an organic light emitting diode, a power supply including a first DC-DC converter that generates a first driving voltage for the organic light emitting diode and that provides the first driving voltage to the display panel, and a second DC-DC converter that generates a second driving voltage for the organic light emitting diode and that provides the second driving voltage to the display panel, the first DC-DC converter including a first inductor and a first switch, the second DC-DC converter including a second inductor and a second switch, the first driving voltage being different from the second driving voltage, and an over-current prevention unit that blocks supplies of the first and second driving voltages when a value of a current flowing through the first inductor is greater than a first reference value, or when a value of a current flowing through the second inductor is greater than a second reference value.

In example embodiments, the over-current prevention unit may include a first detector that detects the current flowing through the first inductor, a second detector that detects the current flowing through the second inductor, a first comparison unit that compares a value of the current flowing through the first inductor with the first reference value, a second comparison unit that compares a value of the current flowing through the second inductor with the second reference value, and a block unit that blocks the supplies of the first and second driving voltages based on comparison results generated by the first and second comparison units.

In example embodiments, the over-current prevention unit may further include an OR-gate that performs an OR operation between the comparison result generated by the first comparison unit and the comparison result generated by the second comparison unit, the OR-gate being located between the first comparison unit and the second comparison unit.

In example embodiments, the over-current prevention unit may further include a counter that counts a voltage block signal that is output from the OR-gate, and that provides the voltage block signal to the block unit when a counted number is equal to a reference number, the voltage block signal being used for blocking the supplies of the first and second driving voltages, the counter being located between the OR-gate and the block unit.

In example embodiments, the counter may receive a count clock signal from outside, the count clock signal being used for controlling a count cycle.

In example embodiments, the organic light emitting display device may further include a controller that provides a power control signal to the power supply, the power control signal being used for allowing the supplies of the first and second driving voltages. Here, the block unit may block the power control signal based on the comparison results generated by the first and second comparison units, the block unit being located between the controller and the power supply.

In example embodiments, the over-current prevention unit may further include a reference set unit that sets the first reference voltage and the second reference voltage.

In example embodiments, the reference set unit may include a first look-up table for storing a plurality of first reference voltages that are suitable for a plurality of display panels, sizes of the display panels being different from one another, a second look-up table for storing a plurality of second reference voltages that are suitable for the display panels, and a selection unit that selects and outputs one of the first reference voltages and one of the second reference voltages.

Therefore, an organic light emitting display device according to example embodiments may prevent an over-current from flowing into a display panel by controlling a power supply not to provide driving voltages to the display panel in case that the over-current is caused between the power supply and the display panel. As a result, damages (e.g., degradation (or burning) of an organic light emitting diode) due to the over-current that is caused between the power supply and the display panel may be properly prevented.

In addition, the organic light emitting display device may include a display panel having any size without any design modification of a power supply unit because a criterion of an over-current can be changed according to a size of the display panel in the organic light emitting display device.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
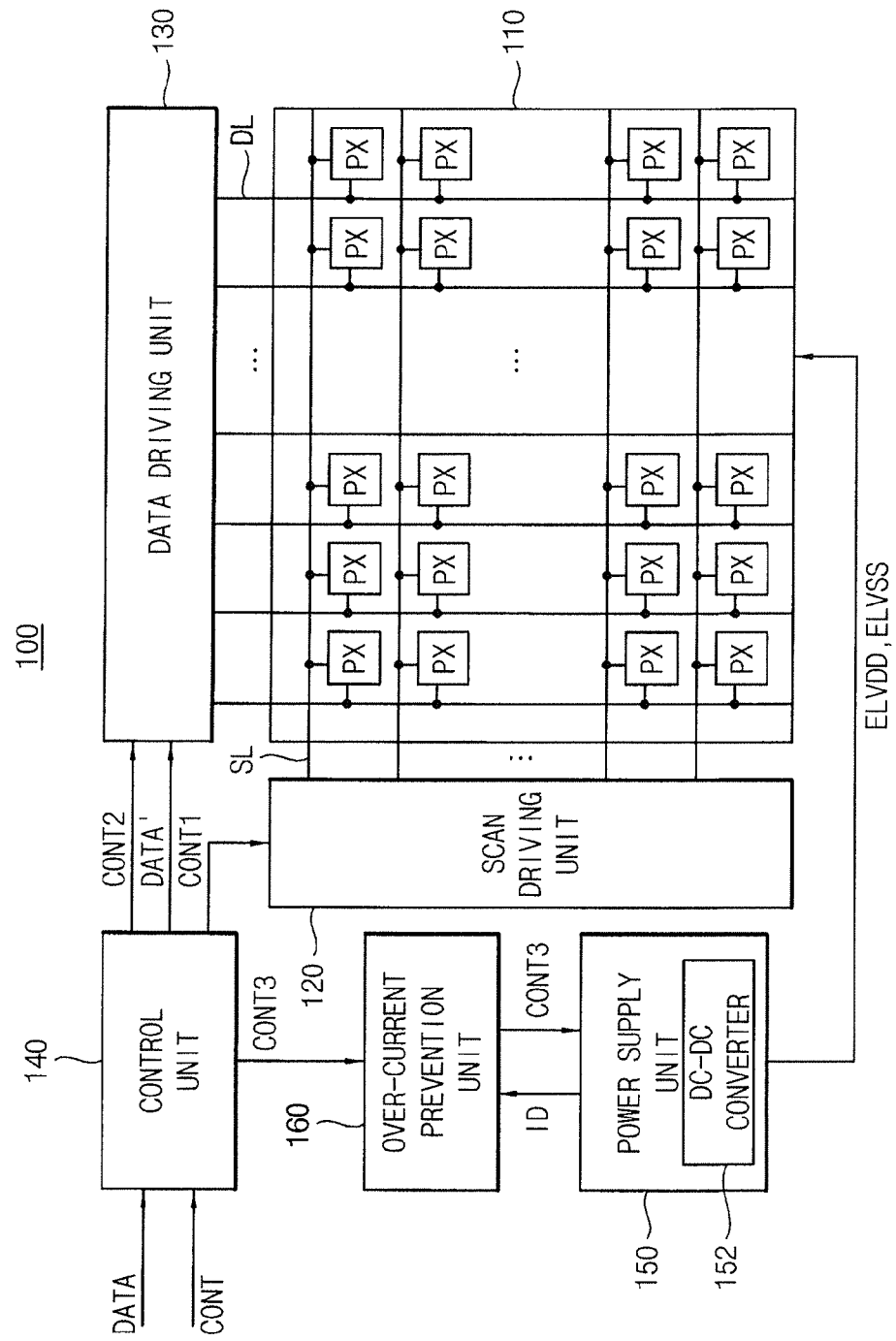
FIG. 1 is a block diagram illustrating an organic light emitting display device according to example embodiments.

Various example embodiments will be described more fully hereinafter with reference to the accompanying drawings, in which some example embodiments are shown. The present inventive concept (e.g., present invention) may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
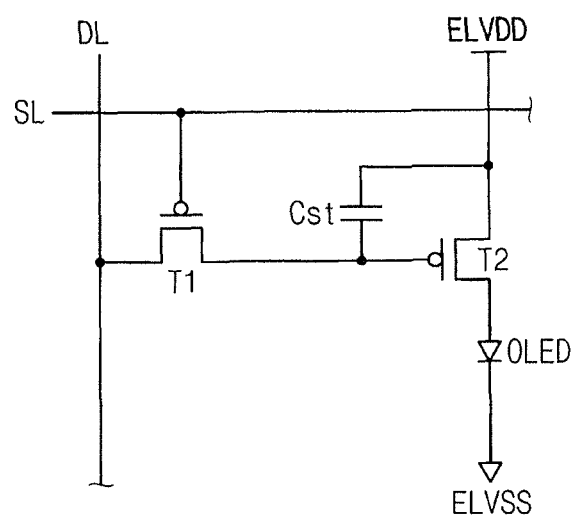
FIG. 2 is a circuit diagram illustrating a pixel circuit included in a display panel of FIG. 1.

FIG. 1 is a block diagram illustrating an organic light emitting display device according to example embodiments. FIG. 2 is a circuit diagram illustrating a pixel circuit included in a display panel of FIG. 1.

Referring to FIGS. 1 and 2, the organic light emitting display device 100 may include a display panel 110, a scan driving unit (e.g., scan driver) 120, a data driving unit (e.g., data driver) 130, a control unit (e.g., controller) 140, a power supply unit (e.g., power supply) 150, and an over-current prevention unit 160.

The display panel 110 includes a plurality of signal-lines and a plurality of pixel circuits PX. The pixel circuits PX are arranged in a matrix form while being coupled to the signal-lines. Each of the pixel circuits PX includes an organic light emitting diode OLED. In addition, the display panel 110 includes a plurality of voltage-lines for providing the pixel circuit PX with driving voltages ELVDD and ELVSS (not illustrated). The driving voltages ELVDD and ELVSS are needed for driving the organic light emitting diode OLED. A voltage level of the first driving voltage ELVDD is greater than a voltage level of the second driving voltage ELVSS. In detail, the voltage-lines include first voltage-lines for providing the first driving voltage ELVDD and second voltage-lines for providing the second driving voltage ELVDD.

The signal-lines include a plurality of scan-lines SL for providing a scan signal and a plurality of data-lines DL for providing a data voltage. For example, the scan-lines SL may be extended in a row direction (e.g., horizontally), and the data-lines DL may be extended in a column direction (e.g., vertically). Therefore, the scan-lines SL may cross the data-lines DL. As illustrated in FIG. 1, one of the scan-lines SL is arranged in parallel with another of the scan-lines SL, and one of the data-lines DL is arranged in parallel with another of the data-lines DL. In one example embodiment, the voltage-lines for providing the driving voltages ELVDD and ELVSS may be arranged in parallel with the data-lines DL, or in parallel with the scan-lines SL. In another example embodiment, the first voltage-lines for providing the first driving voltage ELVDD may be arranged in parallel with the data-lines DL, or in parallel with the scan-lines SL while the second voltage-lines for providing the second driving voltage ELVSS are arranged in parallel with the scan-lines SL, or in parallel with the data-lines DL.

As illustrated in FIG. 2, each of the pixel circuits PX includes the organic light emitting diode OLED, a switching transistor T1, a driving transistor T2, and a storage capacitor Cst. The switching transistor T1 has a three-electrode-structure having a control electrode coupled to the scan-line SL, an input electrode coupled to the data-line DL, and an output electrode coupled to a control electrode of the driving transistor T2. The switching transistor T1 may transfer the data voltage that is input from the data-line DL to the driving transistor T2 in response to the scan signal that is input from the scan-line SL. The driving transistor T2 has a three-electrode-structure having the control electrode coupled to the output electrode of the switching transistor T1, an input electrode coupled to a first voltage-line (not illustrated) for providing the first driving voltage ELVDD, and an output electrode coupled to an anode of the organic light emitting diode OLED. The driving transistor T2 may allow a current to pass through, a value of the current being determined by a voltage level between the control electrode and the output electrode of the driving transistor T2. The storage capacitor Cst is coupled between the control electrode and the input electrode of the driving transistor T2. The storage capacitor Cst is charged with the data voltage that is applied to the control electrode of the driving transistor T2. Hence, an operation state of the driving transistor T2 is maintained based on the data voltage that is stored in the storage capacitor Cst even after the switching transistor T1 is turned-off. The anode of the organic light emitting diode OLED is coupled to the output electrode of the driving transistor T2, and a cathode of the organic light emitting diode OLED is coupled to a second voltage-line (not illustrated) for providing the second driving voltage ELVSS. The organic light emitting diode OLED may emit light of which an intensity is determined by a value of the current that is provided from the driving transistor T2. Namely, as the data voltage is applied to the control electrode of the driving transistor T2 when the switching transistor T1 is turned-on by the scan signal, the driving transistor T2 outputs the current of which a value is determined by a voltage level between the data voltage and the first driving voltage ELVDD. As a result, the driving transistor T2 may control light-emission of the organic light emitting diode OLED. Although a structure of the pixel circuit PX is illustrated in FIG. 2, the structure of the pixel circuit PX is not limited thereto. The pixel circuit PX may be implemented by various structures having the switching transistor T1 and the driving transistor T2.

The scan driving unit (e.g., scan driver) 120 is coupled to the scan-lines SL. The scan driving unit 120 sequentially outputs the scan signal to the scan-lines SL. Here, the scan signal may be a low voltage capable of turning-on the switching transistor T1, or a high voltage capable of turning-off the switching transistor T1. The turn-on and turn-off voltages provided by the scan driver 120 to the switching transistor T1 may be different depending on the type (e.g., N-type) of the transistor used as the switching transistor T1, and is not limited to the present example embodiment.

The data driving unit (e.g., date driver) 130 is coupled to the data-lines DL. The data driving unit 130 converts a data signal DATA' (i.e., a digital signal) to the data voltage (i.e., an analog signal), and outputs the data voltage to the data-lines DL. As illustrated in FIG. 1, the data signal DATA' is provided from the control unit 140. Here, the data voltage may be selected based on a gamma reference voltage. In this case, the data driving unit 130 may receive the gamma reference voltage from a gamma reference voltage generation unit (not illustrated).

The control unit (e.g., controller) 140 receives an image signal DATA from an external image source such as a graphic device and a synchronization signal CONT for controlling a display operation for the image signal DATA. For example, the synchronization signal CONT may include a vertical synchronization signal, a horizontal synchronization signal, a main clock signal, a data enable signal, etc. The control unit 140 processes the image signal DATA to generate the data signal DATA' that is suitable for the display panel 110, and provides the data signal DATA' to the data driving unit 130. In addition, on the basis of the synchronization signal CONT, the control unit 140 generates and outputs a plurality of control signals for controlling operations of the scan driving unit 120, the data driving unit 130, and the power supply unit 150. The control unit 140 generates a scan control signal, a data control signal, and a power control signal to output the scan control signal, the data control signal, and the power control signal to the scan driving unit 120, the data driving unit 130, and the power supply unit 150, respectively. For instance, the scan control signal may include a scan start signal and at least one clock signal, the data control signal may include a horizontal synchronization signal, a load signal, and a data clock signal, and the power control signal may include an output enable signal. In addition, the power control signal may further include a plurality of signals for controlling supplies of the driving voltages ELVDD and ELVSS to the display panel 110.

The power supply unit 150 receives a direct-current (DC) power from an external power source, and generates a plurality of voltages for the display panel 110, the scan driving unit 120, the data driving unit 130, and the control unit 140. For example, the power supply unit 150 may generate the driving voltages ELVDD and ELVSS that are used for an operation of the organic light emitting diode OLED to provide the driving voltages ELVDD and ELVSS to the display panel 110. In addition, the power supply unit 150 may generate a high voltage and a low voltage that are used for generating the scan signal to provide the high voltage and the low voltage to the scan driving unit 120. Further, the power supply unit 150 may generate an analog voltage to provide the analog voltage to the data driving unit 130.

The power supply unit 150 includes a DC-DC converter 152 for generating the driving voltages ELVDD and ELVSS. Here, the DC-DC converter 152 may be a converter for generating the first driving voltage ELVDD or the second driving voltage ELVSS. In one example embodiment, the DC-DC converter 152 may be a converter for generating the first driving voltage ELVDD. In this case, the power supply unit 150 may further include another DC-DC converter (not illustrated) for generating the second driving voltage ELVSS. In another example embodiment, the DC-DC converter 152 may be a converter for generating the second driving voltage ELVSS. In this case, the power supply unit 150 may further include another DC-DC converter (not illustrated) for generating the first driving voltage ELVDD. On the contrary, when the DC-DC converter 152 is a converter for generating the first driving voltage ELVDD, the power supply unit 150 may not include another DC-DC converter for generating the second driving voltage ELVSS. In this case, a ground voltage GND may be used as the second driving voltage ELVSS.

The DC-DC converter 152 may include an inductor, a switching element (e.g., switch), a capacitor, and a diode. The switching element may change an input voltage by performing repetitive on-off operations to generate an output voltage. Thus, a voltage level of the output voltage may be determined by a ratio (i.e., on-off ratio) related to repetitive on-off operations of the switching element. For instance, when the DC-DC converter 152 is a converter for generating the first driving voltage ELVDD, the DC-DC converter 152 may include a boost converter for stepping-up the input voltage. On the other hand, when the DC-DC converter 152 is a converter for generating the second driving voltage ELVSS, the DC-DC converter 152 may include a buck-boost converter for stepping-down the input voltage. According to some example embodiments, the DC-DC converter 152 may include various converters having an inductor and a switching element. The DC-DC converter 152 may include a switching control unit (e.g., switching controller) for controlling the repetitive on-off operations of the switching element.

In the display panel 110, one voltage-line may be short-circuited with a signal-line or another voltage-line that provides a voltage having an opposite polarity. Therefore, an over-current may be caused (i.e., flow) between the power supply unit 150 and the display panel 110. When the over-current is applied to the organic light emitting diode OLED, serious damages (e.g., degradation (or burning) of the organic light emitting diode) may be caused.

Thus, it is desirable to prevent the over-current from flowing between the power supply unit (e.g., power supply) 150 and the display panel 110. Hence, in order to prevent the over-current from flowing between the power supply unit 150 and the display panel 110, the organic light emitting display device 100 includes the over-current prevention unit 160.

The over-current prevention unit 160 detects a current flowing through the inductor of the DC-DC converter 152, and determines whether or not the current flowing through the inductor is the over-current. In addition, the over-current prevention unit 160 blocks the supplies of the driving voltages ELVDD and ELVSS when the over-current is caused between the power supply unit 150 and the display panel 110. In case of an over-current state (i.e., in case that the over-current is caused between the power supply unit 150 and the display panel 110), a value of the current flowing through the inductor of the DC-DC converter 152 is greater than a value of the saturation current of the inductor of the DC-DC converter 152. The saturation current of the inductor of the DC-DC converter 152 may be referred to as a reference value SV. That is, the over-current prevention unit 160 determines that the over-current is caused between the power supply unit 150 and the display panel 110 if a value of the current flowing through the inductor of the DC-DC converter 152 is greater than the reference value SV. Thus, the over-current prevention unit 160 blocks the supplies of the driving voltages ELVDD and ELVSS if a value of the current flowing through the inductor of the DC-DC converter 152 is greater than the reference value SV. For example, the over-current prevention unit 160 may block the driving voltages ELVDD and ELVSS based on a control signal. In one example embodiment, the over-current prevention unit 160 may prevent the over-current by detecting a current flowing through an inductor of a converter for generating the first driving voltage ELVDD. In another example embodiment, the over-current prevention unit 160 may prevent the over-current by detecting a current flowing through an inductor of a converter for generating the second driving voltage ELVSS. That is, the over-current prevention unit 160 may operate as being coupled to the converter for generating the first driving voltage ELVDD, or the converter for generating the second driving voltage ELVSS.

Figure 3A:
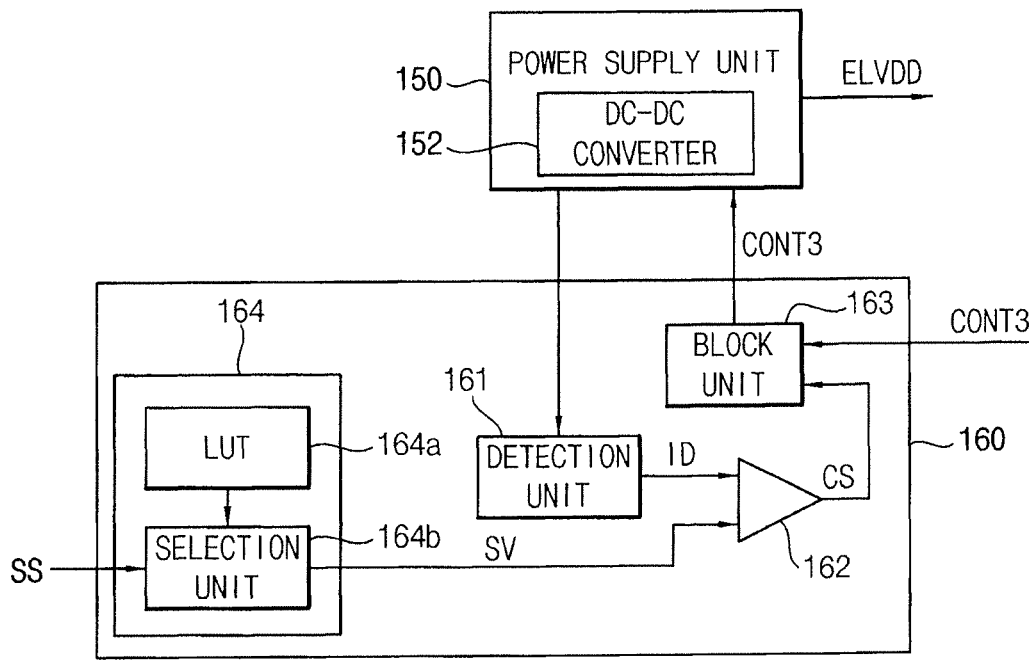
FIG. 3A is a block diagram illustrating an example of an over-current prevention unit in FIG. 1.
Figure 3B:
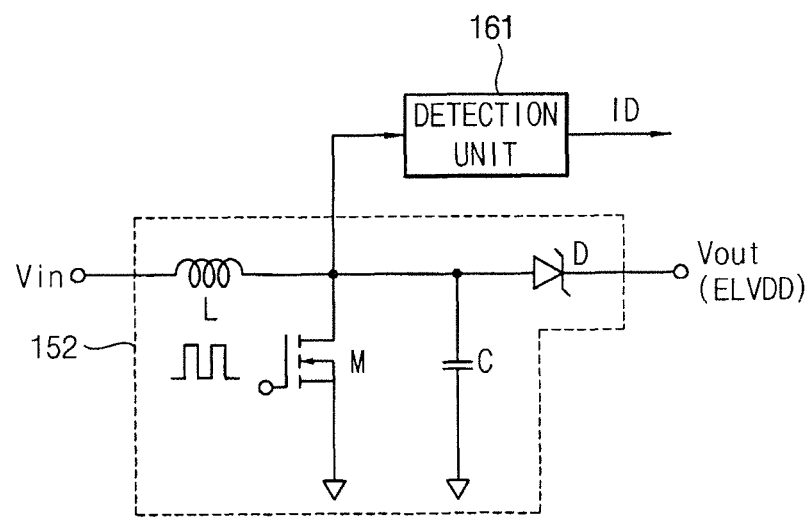
FIG. 3B is a circuit diagram illustrating an example of a DC-DC converter in FIG. 1.

FIG. 3A is a block diagram illustrating an example of an over-current prevention unit in FIG. 1. FIG. 3B is a circuit diagram illustrating an example of a DC-DC converter in FIG. 1.

The power supply unit (e.g., power supply) 150 including the DC-DC converter 152 is illustrated in FIG. 3A. Here, the DC-DC converter 152 may be a converter for generating the first driving voltage ELVDD, and the DC-DC converter 152 may include a boost converter. In FIG. 3B, a basic structure of the boost converter is illustrated for convenience of description.

Referring to FIGS. 3A and 3B, the DC-DC converter 152 generates the first driving voltage ELVDD that is used for an operation of the organic light emitting diode OLED. As illustrated in FIG. 3B, the DC-DC converter 152 includes an inductor L, a switching element (e.g., switch) M, a capacitor C, and a diode D. For example, the switching element M may be a Metal Oxide Semiconductor Field Effect Transistor (MOSFET). An input voltage Vin that is provided from an external power source is applied to an input terminal of the inductor L. Here, the input voltage Vin may correspond to a DC voltage that is provided from the external power source. The inductor L is coupled to the diode D in series. The output voltage Vout is output from an output terminal of the diode D. The switching element M and the capacitor C are coupled to an output terminal of the inductor L in parallel. Thus, the DC-DC converter 152 may step-up the input voltage Vin to output the output voltage Vout by performing repetitive on-off operations of the switching element M based on a signal that is provided to a control electrode of the switching element M.

The over-current prevention unit 160 determines whether an over-current is caused based on a value of a current flowing through the inductor L of the DC-DC converter 152, and blocks supplies of the driving voltages ELVDD and ELVSS when it is determined that the over-current is caused. Namely, the over-current prevention unit 160 blocks the supplies of the driving voltages ELVDD and ELVSS when a value of the current flowing through the inductor L is greater than a reference value SV. Here, the over-current prevention unit 160 may block the supplies of the driving voltages ELVDD and ELVSS by blocking the control signal that the control unit (e.g., controller) 140 provides to the power supply unit (e.g., power supply) 150.

The over-current prevention unit 160 includes a detection unit (e.g., detector) 161, a comparison unit 162, a block unit 163, and a reference set unit 164.

The detection unit (e.g., detector) 161 detects the current flowing through the inductor L of the DC-DC converter 152. The detection unit 161 is coupled to the output terminal (i.e., node) of the inductor L. The detection unit 161 includes an ampere meter (e.g., a current sensor) for detecting the current flowing through the inductor L of the DC-DC converter 152. Although it is described that the detection unit 161 is coupled to the output terminal of the inductor L, it is not limited thereto. For example, the detection unit 161 may be coupled to the input terminal (i.e., node) of the inductor L. Alternatively, the detection unit 161 may be coupled to the output electrode of the switching element M because a saturation current of the inductor L is generally generated during a turn-on operation period of the switching element (e.g., switch) M.

The comparison unit 162 compares a value ID of the current flowing through the inductor L, the value ID being detected by the detection unit 161, with a reference value SV. When the value ID of the current flowing through the inductor L is greater than the reference value SV, it is determined that the over-current is caused (i.e., an over-current state). On the other hand, when the value ID of the current flowing through the inductor L is smaller than the reference value SV, it is determined that the over-current is not caused (i.e., a normal state). Thus, the comparison unit 162 outputs a voltage block signal CS for blocking the supplies of the driving voltages ELVDD and ELVSS when the value ID of the current flowing through the inductor L is greater than the reference value SV. For instance, the voltage block signal CS may be a signal having a logic high level. The comparison unit 162 includes a comparator that compares the value ID of the current flowing through the inductor L with the reference value SV, and that outputs a signal having a logic high level or a signal having a logic low level based on the comparison result.

The block unit 163 blocks the supplies of the driving voltages ELVDD and ELVSS based on the comparison result generated by the comparison unit 162. Namely, the block unit 163 blocks the supplies of the driving voltages ELVDD and ELVSS in response to the voltage block signal CS. The block unit 163 blocks the supplies of the driving voltages ELVDD and ELVSS by blocking a power control signal CONT3 that is provided to the power supply 150. The block unit 163 is located between the control unit (controller) 140 and the power supply 150. That is, the block unit 163 is located on a supply-line of the power control signal CONT3 that the control unit 140 provides to the power supply unit (e.g., power supply) 150. On the basis of the comparison result generated by the comparison unit 162, the block unit 163 provides the power control signal CONT3 to the power supply unit 150, or blocks the power control signal CONT3 from the power supply unit 150. The block unit 163 includes a switching element. The block unit 163 may be a switching element having a three-electrode-structure that receives the power control signal CONT3 (i.e., as an input signal), and that outputs the power control signal CONT3 (i.e., as an output signal) based on the comparison result (i.e., as a control signal) generated by the comparison unit 162. The switching element of the block unit 163 may be a MOSFET. The power control signal CONT3 that is blocked by the block unit 163 may be substantially an output enable signal OE by which the driving voltages ELVDD and ELVSS are output. The supplies of the driving voltages ELVDD and ELVSS are concurrently (e.g., simultaneously) controlled by the power control signal CONT3. In this case, the supplies of the driving voltages ELVDD and ELVSS may be concurrently (e.g., simultaneously) blocked by the block unit 163. Alternatively, the supplies of the driving voltages ELVDD and ELVSS may be individually controlled by the power control signal CONT3. In this case, the supplies of the driving voltages ELVDD and ELVSS may be individually blocked by the block unit 163.

The reference set unit 164 sets the reference value SV that is a criterion of the over-current. As described above, it is desirable that the reference value SV is set as the saturation current of the inductor L. The saturation current of the inductor L may be obtained by repetitive experiments. That is, by repetitive experiments, a value of the current flowing through the inductor L at the time when a fault occurs in the organic light emitting diode OLED may be set as the reference value SV. Alternatively, the reference value SV may be set by theoretical calculations. For example, the reference value SV may be set based on the relation between the peak current Ipeak of the inductor L that is calculated using input/output data, and the saturation current of the inductor L that is obtained by repetitive experiments.

[Table 1] shows the peak current Ipeak of the inductor L obtained by theoretical calculations, and the saturation current of the inductor L obtained by repetitive experiments with respect to various display panels of which sizes are different from each other.

TABLE 1

| Panel Size (inch) | Peak Current of Inductor (Theoretical) | Saturation Current of Inductor (Experimental) |
|---|---|---|
| 3.67" WV | 516 [mA] | 737 [mA] |
| 3.97" WV | 690 [mA] | 982 [mA] |
| 4.27" WV | 770 [mA] | 1.10 [A] |
| 4.52" WV | 900 [mA] | 1.29 [A] |

As shown in [Table 1] above, it should be understood that the saturation current of the inductor L obtained by repetitive experiments is about 1.42~1.43 times greater than the peak current Ipeak of the inductor L obtained by theoretical calculations. Accordingly, by reflecting the ratio of the reference value SV, and by considering a few margins for the reference value SV, the reference value SV may be set as a value that is about 1.5 times greater than a value of the peak current Ipeak of the inductor L obtained by theoretical calculations.

The reference set unit 164 sets the reference value SV differently according to the display panel 110. For example, the reference set unit 164 may set the reference value SV differently according to a size (e.g., measured in inches) of the display panel 110.

The reference set unit 164 in the described embodiment includes a look-up table (LUT) 164a and a selection unit (e.g., selector) 164b.

The look-up table 164a stores a plurality of reference values SV. For example, the look-up table 164a stores a plurality of reference values SV for a plurality of display panels 110. Since sizes of the display panels 110 are different from one another, the reference values SV may be different from each other. For example, the look-up table 164a stores the reference values SV (e.g., in a table form) with information (e.g., size) related to a plurality of display panels 110.

The selection unit 164b selects one reference value SV from among the reference values SV stored in the look-up table 164a to output the selected reference value SV. That is, the selection unit 164b selects and outputs one reference value SV that is suitable for the display panel 110. For instance, the selection unit 164b selects and outputs one reference value SV based on a selection signal SS that is provided from outside. The selection signal SS is a kind of information (e.g., size) related to the display panel 110. The selection unit 164b may receive the selection signal SS from the display panel 110 or the control unit 140. In case that the selection signal SS is received from the control unit 140, the control unit 140 may acquire the information related to the display panel 110 to generate and output the selection signal SS based on the information related to the display panel 110. Alternatively, the selection signal SS may be input by a user (e.g., operator). In this case, an input device or apparatus coupled to the selection unit 164b may be included.

As described above, in case that the reference value SV is set by the reference set unit 164, the reference value SV may be changed according to a size of the display panel 110. Therefore, embodiments of the present invention may be applied to various display panels 110 having various sizes. Generally, consumed current may differ according to a size of the display panel 110. However, since the reference set unit 164 sets the reference value SV differently according to a size of the display panel 110, the over-current prevention unit 164 may normally operate even when a size of the display panel 110 is changed.

The over-current prevention unit 160 may further include a storage unit (not illustrated) for storing the reference value SV. The storage unit may be located between the reference set unit 164 and the comparison unit 162. The storage unit may store the reference value SV that is set by the reference set unit 164, and may provide the reference value SV to the comparison unit 162. In case that the over-current prevention unit 160 includes the storage unit, a set operation of the reference value SV may not be repeated for the same display panel 110. According to some example embodiments, the reference set unit 164 may be a memory device in which one reference value SV is stored.

Figure 4:
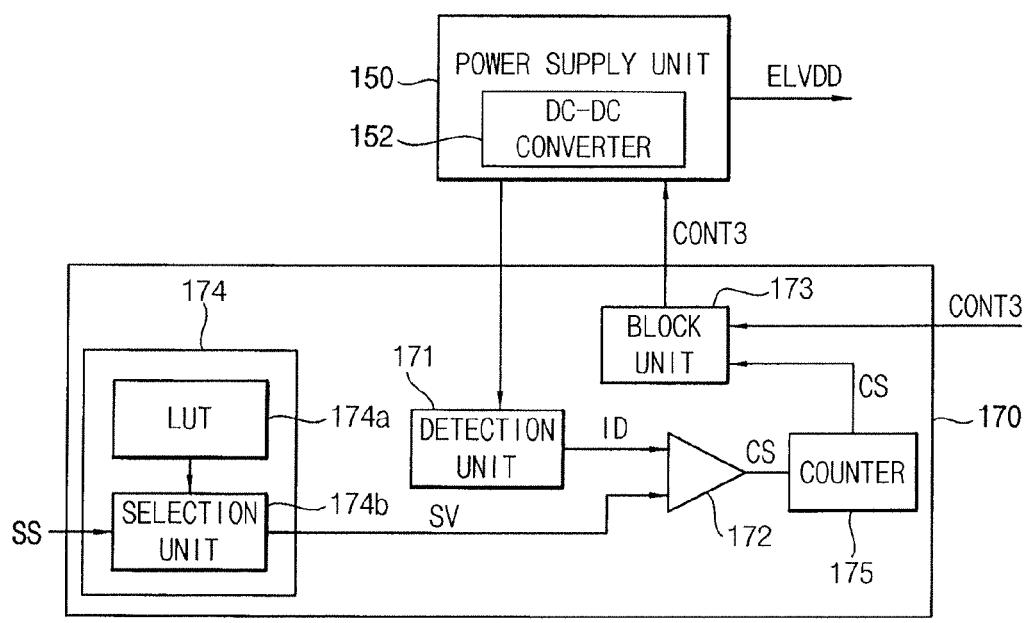
FIG. 4 is a block diagram illustrating another example of an over-current prevention unit in FIG. 1.

FIG. 4 is a block diagram illustrating another example of an over-current prevention unit in FIG. 1.

Referring to FIGS. 1, 2, and 4, the over-current prevention unit 170 may include a detection unit (e.g., detector) 171, a comparison unit 172, a block unit 173, a reference set unit 174, and a counter 175.

Here, except for the counter 175, the over-current prevention unit 170 is substantially the same as the over-current prevention unit 160 that is described in reference to FIGS. 3A and 3B. Therefore, duplicated descriptions may be omitted below.

The block unit 173 blocks supplies of driving voltages ELVDD and ELVSS based on the comparison result generated by the comparison unit 172. Here, the block unit 173 does not receive a voltage block signal CS for blocking the supplies of the driving voltages ELVDD and ELVSS from the comparison unit 172 but from the counter 175.

The counter 175 is located between the comparison unit 172 and the block unit 173. The counter 175 counts the voltage block signal CS output from the comparison unit 172 when a value ID of a current flowing through an inductor L is greater than a reference value SV. For example, the voltage block signal CS may include a signal having a logic high level. In this case, the counter 175 may count the voltage block signal CS output from the comparison unit 172, and may output the signal having a logic high level when a counted number is equal to a reference number (e.g., predetermined number). In example embodiments, the signal having a logic high level output from the counter 175 may be substantially the voltage block signal CS. The counter 175 determines whether the voltage block signal CS is maintained during a reference time or time period (e.g., predetermined time) by counting the voltage block signal CS (e.g., the signal having a logic high level) output from the comparison unit 172.

In case of an 8-bits counter, for example, the 8-bits counter may output the voltage block signal CS having a logic high level when the voltage block signal CS having a logic high level is counted up to 256. On the other hand, the 8-bits counter may output the voltage block signal CS having a logic low level before the voltage block signal CS having a logic high level is counted up to 256. A count cycle of the counter 175 is controlled by a count clock signal CC that is input from outside. When a cycle of the count clock signal CC is 1.6 MHz, one count cycle of the counter 175 is 0.625 μs. Since the counter 175 counts the voltage block signal CS up to 256, a count cycle of the counter 175 is 0.16 ms. Hence, in case that the 8-bits counter is used, and a cycle of the count clock signal CC is 1.6 MHz, the voltage block signal CS having a logic high level is output when the voltage block signal CS having a logic high level is maintained during 0.16 ms. An operation time of the counter 175 may be controlled by adjusting a cycle of the count clock signal CC and a bit-number of element that decides the number of counts.

As described above, the counter 175 determines whether or not the voltage block signal CS output from the comparison unit 172 is maintained during a reference time or time period (e.g., predetermined time). Therefore, the block unit 173 receives the voltage block signal CS when the comparison unit 172 maintains outputting the voltage block signal CS during a reference time or time period (e.g., predetermined time). Thus, the over-current prevention unit 170 may prevent an unnecessary or undesired block operation of the driving voltages ELVDD and ELVSS when a transient over-current is caused. As a result, the over-current prevention unit 170 may improve the stability and the reliability of an over-current prevention operation.

Figure 5:
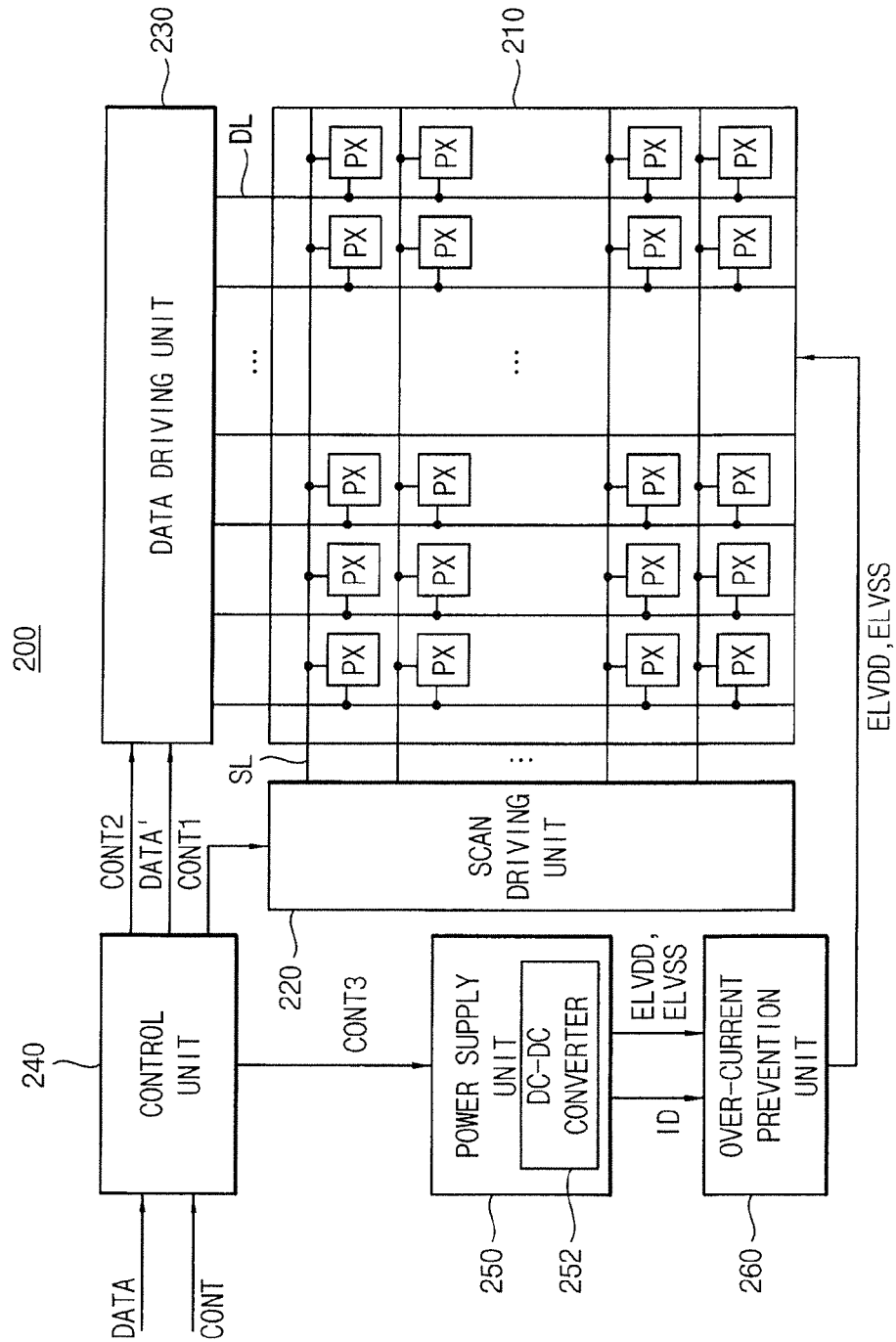
FIG. 5 is a block diagram illustrating an organic light emitting display device according to example embodiments.
Figure 6:
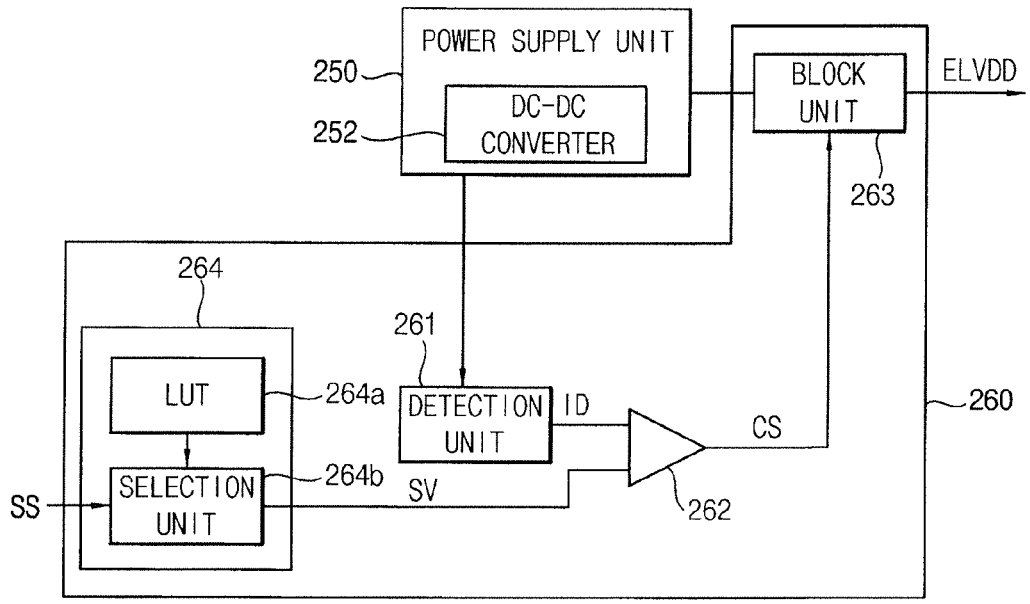
FIG. 6 is a block diagram illustrating an example of an over-current prevention unit in FIG. 5.

FIG. 5 is a block diagram illustrating an organic light emitting display device according to example embodiments. FIG. 6 is a block diagram illustrating an example of an over-current prevention unit in FIG. 5.

Referring to FIGS. 5 and 6, the organic light emitting display device 200 includes a display panel 210, a scan driving unit (e.g., scan driver) 220, a data driving unit (e.g., data driver) 230, a control unit (e.g., controller) 240, a power supply unit (e.g., power supply) 250, and an over-current prevention unit 260.

Here, except for the over-current prevention unit 260, the organic light emitting display device 200 is substantially the same as the organic light emitting display device 100 that is described in reference to FIGS. 1 and 2. Thus, duplicated descriptions may be omitted below.

The power supply unit 250 operates based on a power control signal CONT3 that is provided from the control unit 240. The power supply unit 250 receives a direct-current (DC) power from an external power source, and generates a plurality of voltages for the display panel 210, the scan driving unit 220, the data driving unit 230, and the control unit 240. For example, the power supply unit 250 may generate driving voltages ELVDD and ELVSS that are used for an operation of the organic light emitting diode OLED to provide the driving voltages ELVDD and ELVSS to the display panel 210.

The power supply unit 250 includes a DC-DC converter 252 for generating the driving voltages ELVDD and ELVSS. The second driving voltage ELVSS is lower than the first driving voltage ELVDD. The DC-DC converter 252 may be a converter for generating the first driving voltage ELVDD or the second driving voltage ELVSS. The DC-DC converter 252 may include an inductor, a switching element (e.g., switch), a capacitor, and a diode (not illustrated).

The over-current prevention unit 260 includes a detection unit (e.g., detector) 261, a comparison unit 262, a block unit 263, and a reference set unit 264.

Here, except for the block unit 263, the over-current prevention unit 260 is substantially the same as the over-current prevention unit 160 that is described in reference to FIGS. 3A and 3B. Thus, duplicated descriptions may be omitted below.

The block unit 263 blocks supplies of the driving voltages ELVDD and ELVSS based on the comparison result generated by the comparison unit 262. The block unit 263 blocks the supplies of the driving voltages ELVDD and ELVSS in response to a voltage block signal CS. The block unit 263 is located between the power supply unit 250 and the display panel 210. The block unit 263 is located on supply-lines of the driving voltages ELVDD and ELVSS that the power supply unit 250 provides to the display panel 210. The block unit 263 blocks the supplies of the driving voltages ELVDD and ELVSS by shutting-off (i.e., open-circuiting) the supply-lines of the driving voltages ELVDD and ELVSS. The supply-line of the first driving voltage ELVDD is separated from the supply-line of the second driving voltage ELVSS. Thus, the block unit 263 is located on the supply-line of the first driving voltage ELVDD, or on the supply-line of the second driving voltage ELVSS. The block unit 263 is located on a voltage-line through which a voltage generated by the DC-DC converter 252 is provided. That is, when the DC-DC converter 252 is a converter for generating the first driving voltage ELVDD, the block unit 263 is located on the supply-line of the first driving voltage ELVDD. On the other hand, when the DC-DC converter 252 is a converter for generating the second driving voltage ELVSS, the block unit 263 is located on the supply-line of the second driving voltage ELVSS. Alternatively, the block unit 263 may be located on the supply-lines of the driving voltages ELVDD and ELVSS, and may operate based on the comparison result generated by the comparison unit 262. The block unit 263 may be a switching element (e.g., switch) having a three-electrode-structure, the switching element using the voltage block signal CS output from the comparison unit 262 as a control signal. The switching element may be a MOSFET.

Figure 7:
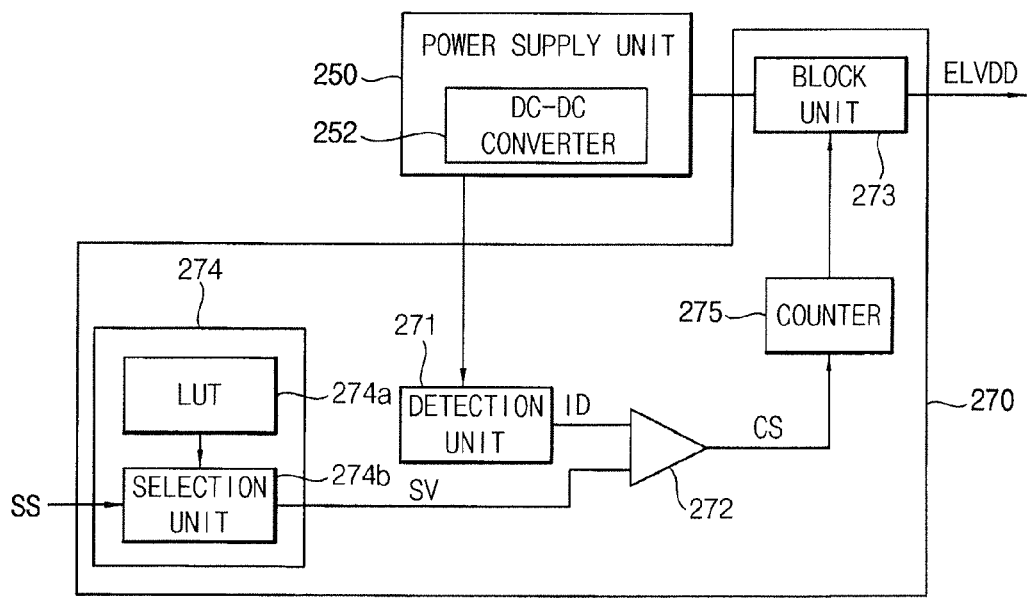
FIG. 7 is a block diagram illustrating another example of an over-current prevention unit in FIG. 5.

FIG. 7 is a block diagram illustrating another example of an over-current prevention unit in FIG. 5.

Referring to FIGS. 5 and 7, the over-current prevention unit 270 may include a detection unit 271, a comparison unit 272, a block unit 273, a reference set unit 274, and a counter 275.

Here, except for the counter 275, the over-current prevention unit 270 is substantially the same as the over-current prevention unit 260 that is described in reference to FIG. 6. Thus, duplicated descriptions may be omitted below.

The block unit 273 blocks supplies of the driving voltages ELVDD and ELVSS based on the comparison result generated by the comparison unit 272. Here, the block unit 273 does not receive a voltage block signal CS for blocking the supplies of the driving voltages ELVDD and ELVSS from the comparison unit 272 but from the counter 275.

The counter 275 is located between the comparison unit 272 and the block unit 273. The counter 275 is substantially the same as the counter 175 of the over-current prevention unit 170. The counter 275 counts the voltage block signal CS output from the comparison unit 272. The counter 275 provides the voltage block signal CS to the block unit 273 when a counted number is equal to a reference number (e.g., predetermined number). Thus, the block unit 273 receives the voltage block signal CS when the voltage block signal CS output from the comparison unit 272 is maintained during a reference time or time period (e.g., predetermined time).

Figure 8:
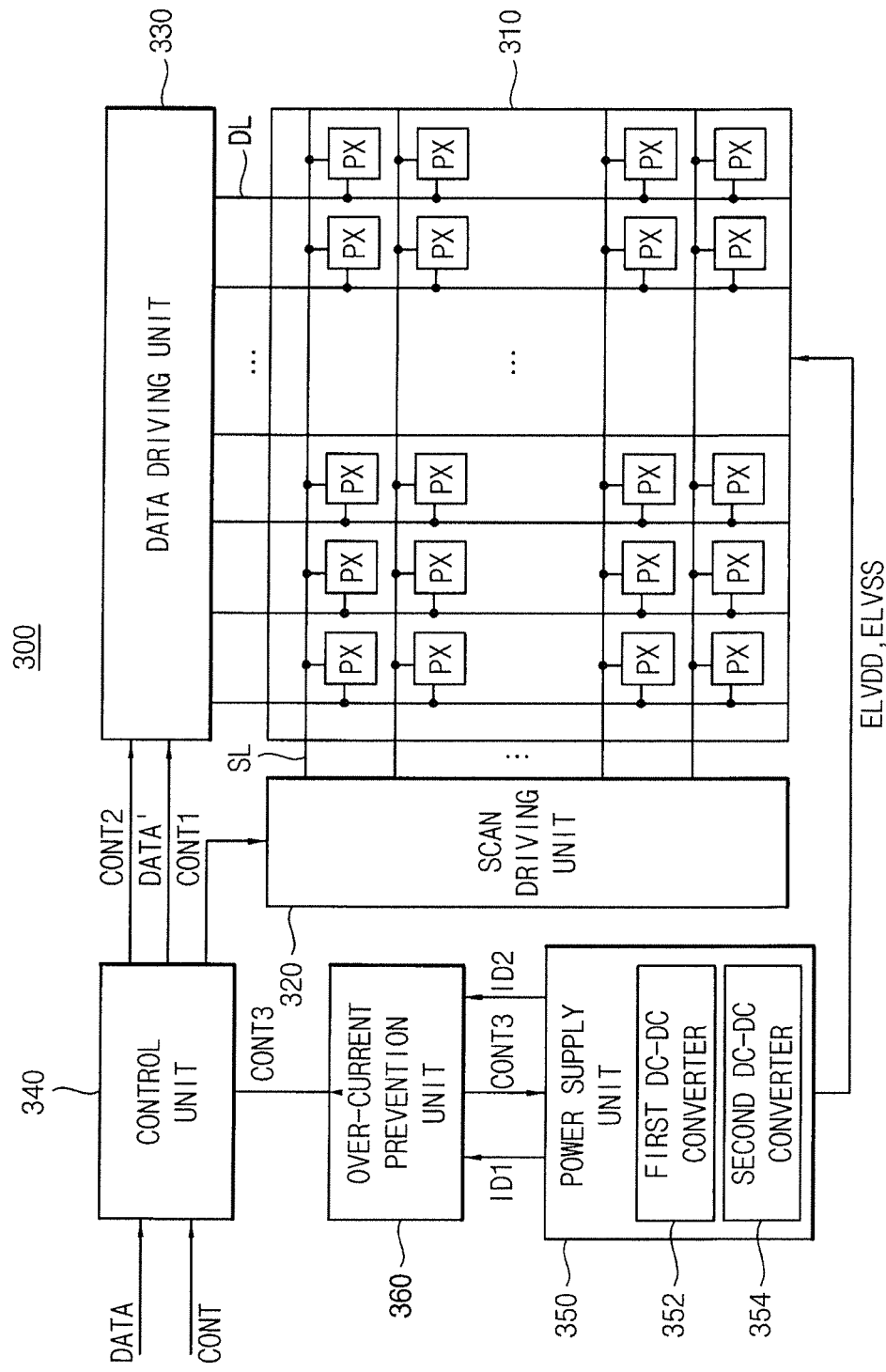
FIG. 8 is a block diagram illustrating an organic light emitting display device according to example embodiments.
Figure 9:
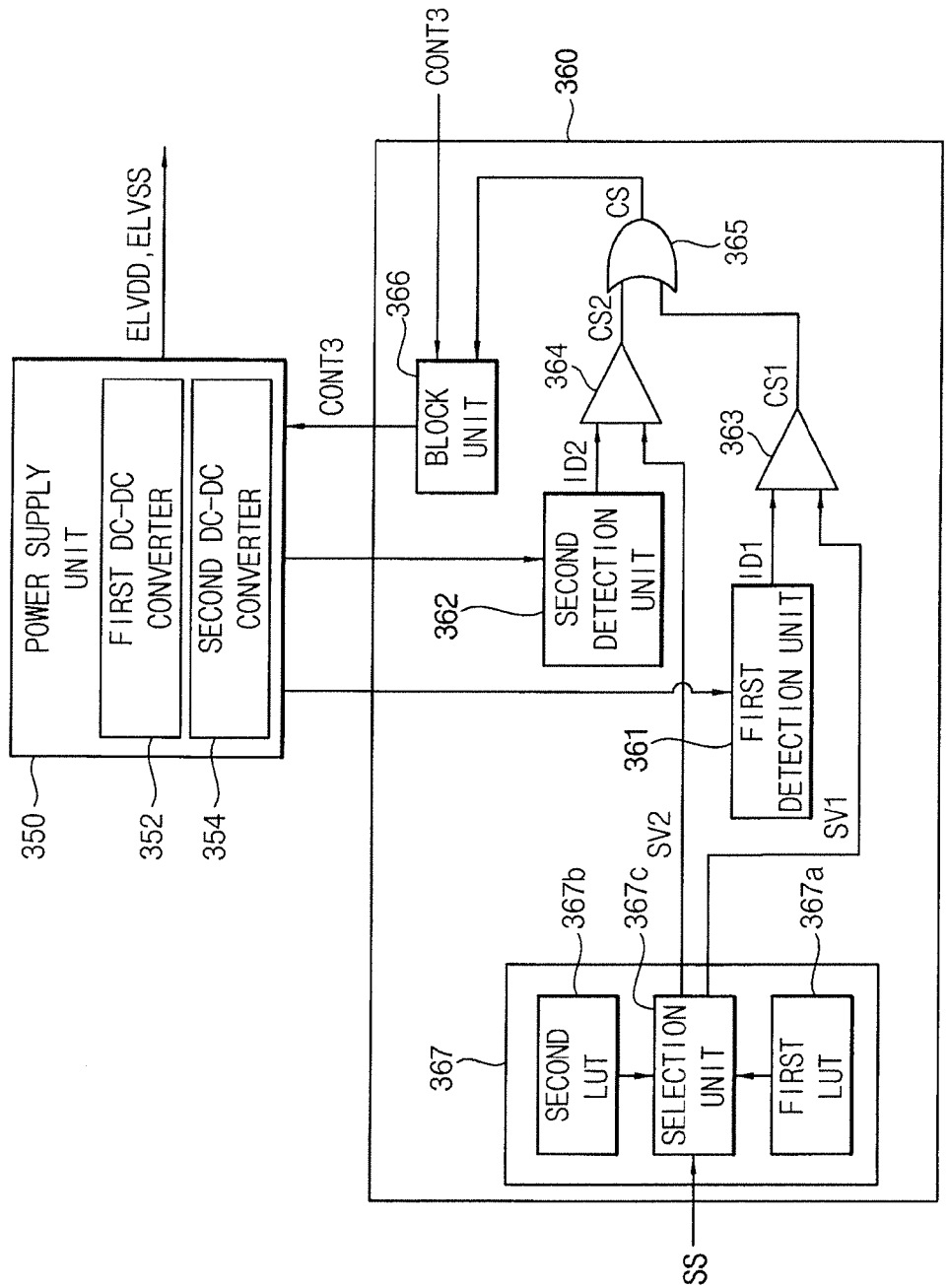
FIG. 9 is a block diagram illustrating an example of an over-current prevention unit in FIG. 8.

FIG. 8 is a block diagram illustrating an organic light emitting display device according to example embodiments. FIG. 9 is a block diagram illustrating an example of an over-current prevention unit in FIG. 8.

Referring to FIGS. 8 and 9, the organic light emitting display device 300 may include a display panel 310, a scan driving unit (e.g., scan driver) 320, a data driving unit (e.g., data driver) 330, a control unit (e.g., controller) 340, a power supply unit (e.g., power supply) 350, and an over-current prevention unit 360.

Here, except for the power supply unit 350 and the over-current prevention unit 360, the organic light emitting display device 300 is substantially the same as the organic light emitting display device 100 that is described in reference to FIGS. 1 and 2. Thus, duplicated descriptions may be omitted below.

The power supply unit 350 includes two DC-DC converters 352 and 354 for generating driving voltages ELVDD and ELVSS that are used for an operation of the organic light emitting diode OLED. The second driving voltage ELVSS is lower than the first driving voltage ELVDD. As illustrated in FIG. 8, the power supply unit 350 includes the first DC-DC converter 352 for generating the first driving voltage ELVDD, and the second DC-DC converter 354 for generating the second driving voltage ELVSS. Although not illustrated in FIG. 8, the first DC-DC converter 352 may include a first inductor, a first switching element, a first capacitor, and a first diode, and the second DC-DC converter 352 may include a second inductor, a second switching element, a second capacitor, and a second diode. The arrangement of elements in the first DC-DC converter 352 is different from the arrangement of elements in the second DC-DC converter 354. For example, the first DC-DC converter may be a step-up boost converter, and the second DC-DC converter may be a step-down boost converter.

The over-current prevention unit 360 detects a current flowing through a first inductor of the first DC-DC converter 352, and a current flowing through a second inductor of the second DC-DC converter 354, and determines whether the current flowing through the first inductor or the current flowing through the second inductor is an over-current. In addition, the over-current prevention unit 360 blocks the supplies of the driving voltages ELVDD and ELVSS if it is determined that the over-current is caused. The over-current prevention unit 360 blocks the supplies of the driving voltages ELVDD and ELVSS when a value of the current flowing through the first inductor of the first DC-DC converter 352 is greater than a first reference value SV1, or when a value of the current flowing through the second inductor of the second DC-DC converter 354 is greater than a second reference value SV2. That is, the over-current prevention unit 360 blocks the supply of the first driving voltage ELVDD, or the supply of the second driving voltage ELVSS if it is determined that the over-current is caused.

The over-current prevention unit 360 includes a first detection unit (e.g., first detector) 361, a second detection unit (e.g., second detector) 362, a first comparison unit 363, a second comparison unit 364, an OR-gate unit (e.g., OR-gate) 365, a block unit 366, and a reference set unit 367.

The first detection unit 361 detects the current flowing through the first inductor of the first DC-DC converter 352.

The second detection unit 362 detects the current flowing through the second inductor of the second DC-DC converter 354.

Other features of the first detection unit 361 and the second detection unit 362 are substantially the same as the features of the detection unit 151 that are described in reference to FIGS. 3A and 3B.

The first comparison unit 363 compares a value ID1 of the current flowing through the first inductor of the first DC-DC converter 352 (i.e., detected by the first detection unit 361) with the first reference value SV1. Here, when a value ID1 of the current flowing through the first inductor is greater than the first reference value SV1, the first comparison unit 363 outputs a first voltage block signal CS1. The fact that a value ID1 of the current flowing through the first inductor is greater than the first reference value SV1 means that the over-current is caused. For instance, the first voltage block signal CS1 may be a signal having a logic high level.

The second comparison unit 364 compares a value ID2 of the current flowing through the second inductor of the second DC-DC converter 354 (i.e., detected by the second detection unit 362) with the second reference value SV2. Here, when a value ID2 of the current flowing through the second inductor is greater than the second reference value SV2, the second comparison unit 364 outputs a second voltage block signal CS2. The fact that a value ID2 of the current flowing through the second inductor is greater than the second reference value SV2 means that the over-current is caused. For instance, the second voltage block signal CS2 may be a signal having a logic high level.

Other features of the first comparison unit 363 and the second comparison unit 364 are substantially the same as the features of the comparison unit 151 that are described in reference to FIGS. 3A and 3B.

The OR-gate unit 365 performs an OR-gating operation (e.g., OR operation) between the comparison result generated by the first comparison unit 363 and the comparison result generated by the second comparison unit 364. The OR-gate unit 365 is located between the first and second comparison units 363 and 364 and the block unit 366. That is, the OR-gate unit 365 receives the comparison result generated by the first comparison unit 363 and the comparison result generated by the second comparison unit 364, and outputs a result of the OR-gating operation between the comparison result generated by the first comparison unit 363 and the comparison result generated by the second comparison unit 364. The OR-gate unit 365 outputs the voltage block signal CS having a logic high level when any of the first voltage block signal CS1 output from the first comparison unit 363 and the second voltage block signal CS2 output from the second comparison unit 364 has a logic high level. Hence, the OR-gate unit 365 may output the voltage block signal CS when it is determined that the over-current is caused on the basis of the comparison result of the first comparison unit 363 and the comparison result of the second comparison unit 364.

The block unit 366 blocks the supplies of the driving voltages ELVDD and ELVSS based on the comparison result of the first comparison unit 363 and the comparison result of the second comparison unit 364. The block unit 366 blocks the supplies of the driving voltages ELVDD and ELVSS in response to the voltage block signal CS output from the OR-gate unit 365. Other features of the block unit 366 are substantially the same as the features of the block unit 151 that are described in reference to FIGS. 3A and 3B.

The reference set unit 367 sets the first reference value SV1 and the second reference value SV2. Here, the first and second reference values SV1 and SV2 may be changed according to the display panel 310. In detail, the reference set unit 367 sets the first reference value SV1 and the second reference value SV2 according to a size (e.g., measured in inches) of the display panel 310.

The reference set unit 367 includes a first look-up table (LUT) 367a, a second look-up table (LUT) 367b, and a selection unit (e.g., selector) 367c.

The first look-up table 367a stores a plurality of first reference values SV1. In detail, the first look-up table 367a stores a plurality of first reference values SV1 for a plurality of display panels 310. Since sizes of the display panels 310 are different from one another, the first reference values SV1 may be different from each other. For example, the first look-up table 367a stores the first reference values SV1 (e.g., in a table form) with information (e.g., size) related to the display panels 310.

The second look-up table 367b stores a plurality of second reference values SV2. For example, the second look-up table 367b stores a plurality of second reference values SV2 for a plurality of display panels 310. Since sizes of the display panels 310 are different from one another, the second reference values SV2 may be different from each other. For example, the second look-up table 367b stores the second reference values SV2 (e.g., in a table form) with information (e.g., size) related to the display panels 310.

Although it is described that the first look-up table 367a and the second look-up table 367b are individually implemented, the first look-up table 367a and the second look-up table 367b may be implemented together. That is, according to some example embodiments, the first reference values SV1 and the second reference values SV2 may be stored together (e.g., in one table form).

The selection unit 367c selects one first reference value SV1 among the first reference values SV1 stored in the first look-up table 367a to output the selected first reference value SV1, and selects one second reference value SV2 among the second reference values SV2 stored in the second look-up table 367b to output the selected second reference value SV2. For instance, the selection unit 367c selects the first reference value SV1 and the second reference value SV2, based on a selection signal SS that is provided from outside.

Figure 10:
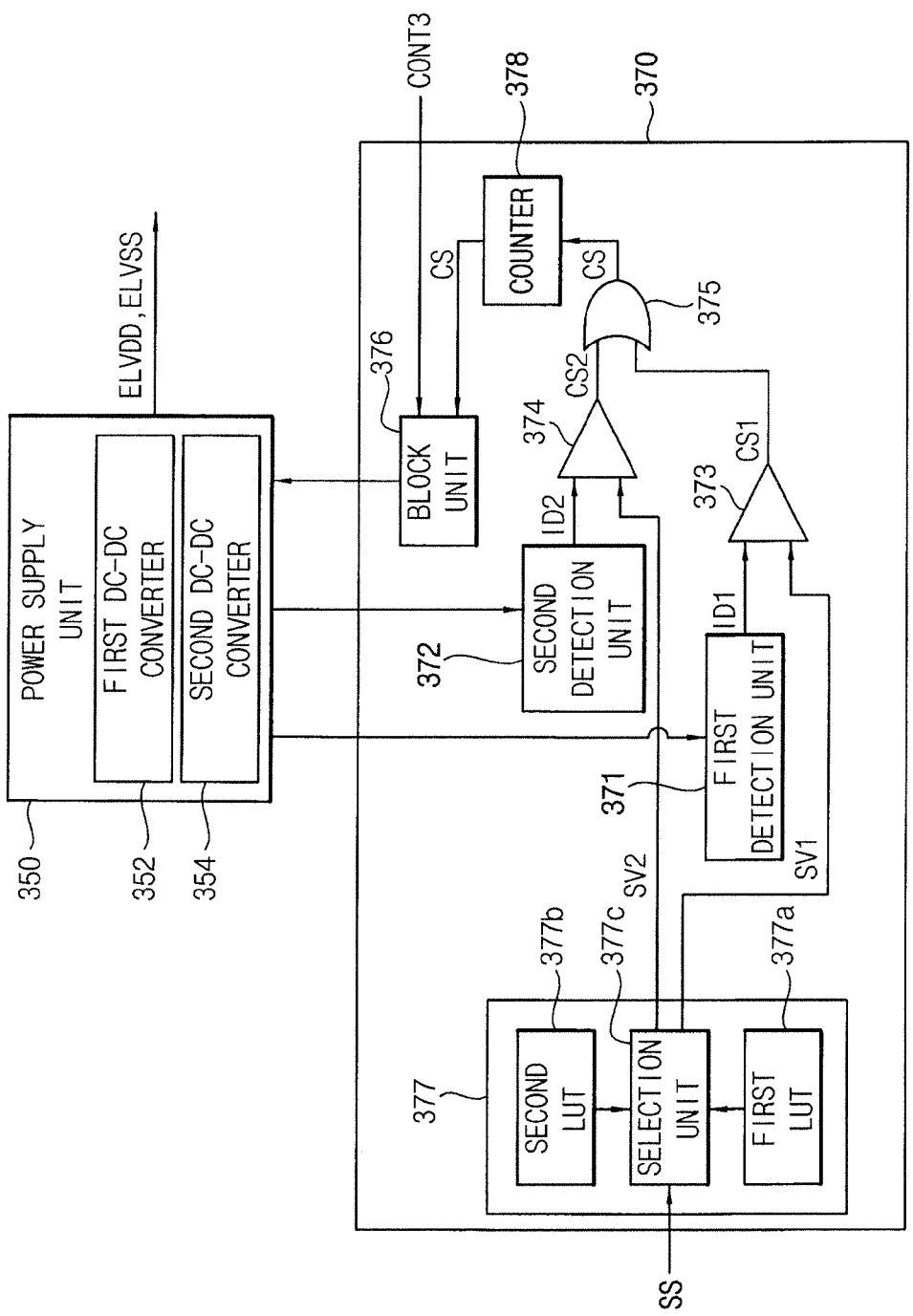
FIG. 10 is a block diagram illustrating another example of an over-current prevention unit in FIG. 8.

FIG. 10 is a block diagram illustrating another example of an over-current prevention unit in FIG. 8.

Referring to FIGS. 8 and 10, the over-current prevention unit 370 may include a first detection unit (e.g., first detector) 371, a second detection unit (e.g., second detector) 372, a first comparison unit 373, a second comparison unit 374, an OR-gate unit (e.g., OR-gate) 375, a block unit 376, a reference set unit 377, and a counter 378.

Here, except for the counter 378, the over-current prevention unit 370 is substantially the same as the over-current prevention unit 360 that is described in reference to FIG. 9. Thus, duplicated descriptions may be omitted below.

The block unit 376 blocks supplies of the driving voltages ELVDD and ELVSS based on the comparison results that are generated by the first and second comparison units 373 and 374. The block unit 376 may block the supplies of the driving voltages ELVDD and ELVSS in response to a voltage block signal CS output from the OR-gate unit 375. Here, the block unit 376 does not receive the voltage block signal CS for blocking the supplies of the driving voltages ELVDD and ELVSS from the OR-gate unit 375 but from the counter 378.

The counter 378 is located between the OR-gate unit 375 and the block unit 376. The counter 378 counts the voltage block signal CS output from the OR-gate unit 375. For example, the voltage block signal CS may include a signal having a logic high level. The counter 378 counts the voltage block signal CS output from the OR-gate unit 375, and outputs the signal having a logic high level when a counted number is equal to a reference number (e.g., a predetermined number). In example embodiments, the signal having a logic high level output from the counter 378 may be substantially the voltage block signal CS. The block unit 376 receives the voltage block signal CS when the voltage block signal CS (e.g., the signal having a logic high level) is maintained during a reference time or reference time period (e.g., a predetermined time), the voltage block signal CS being output from the OR-gate unit 375.

Other features of the counter 378 are substantially the same as the features of the counter 175 that are described referring to FIG. 4 and the features of the counter 275 that are described referring to FIG. 7.

Figure 11:
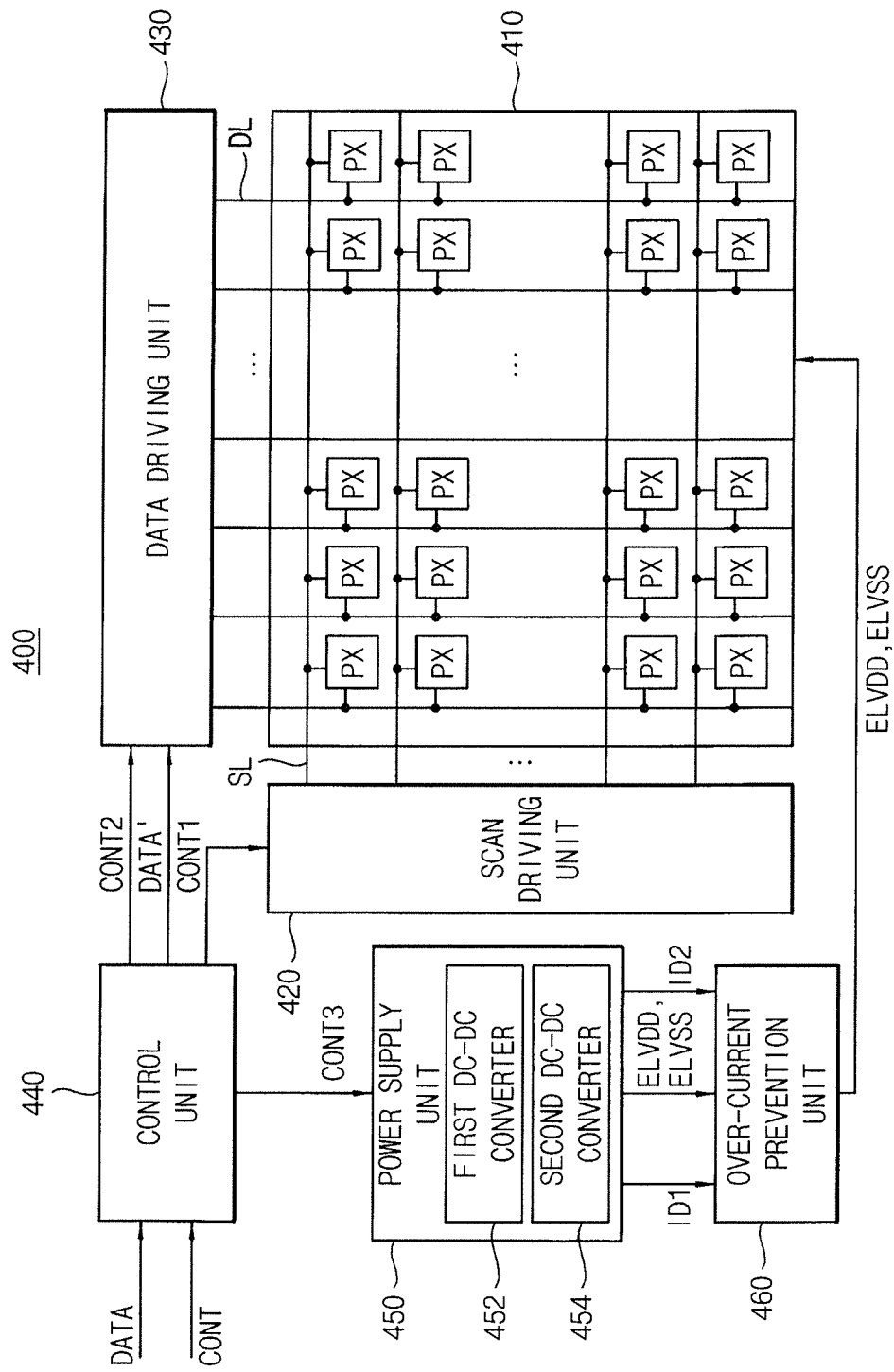
FIG. 11 is a block diagram illustrating an organic light emitting display device according to example embodiments.
Figure 12:
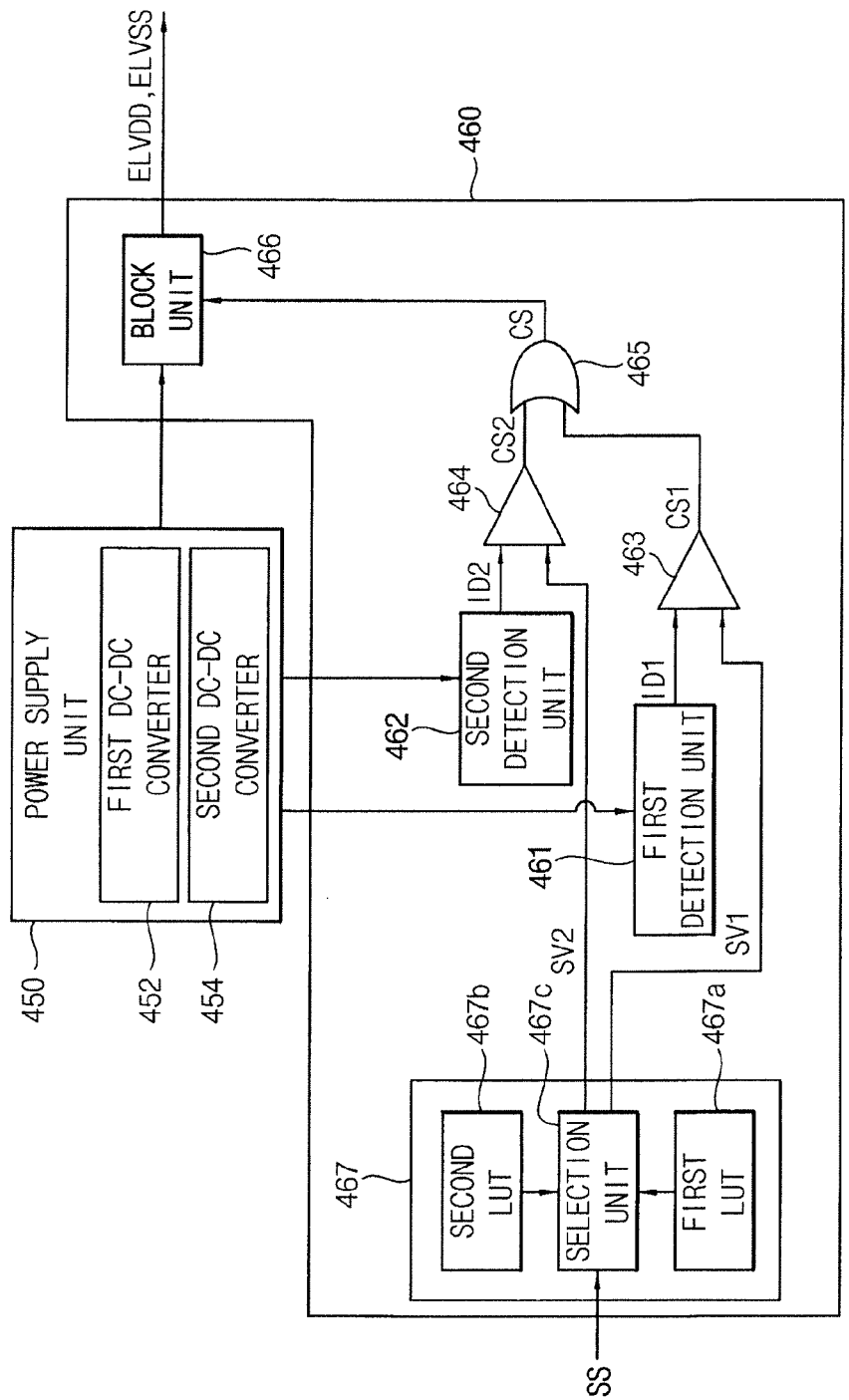
FIG. 12 is a block diagram illustrating an example of an over-current prevention unit in FIG. 11.

FIG. 11 is a block diagram illustrating an organic light emitting display device according to example embodiments. FIG. 12 is a block diagram illustrating an example of an over-current prevention unit in FIG. 11.

Referring to FIGS. 11 and 12, the organic light emitting display device 400 may include a display panel 410, a scan driving unit (e.g., scan driver) 420, a data driving unit (e.g., date driver) 430, a control unit (e.g., controller) 440, a power supply unit (e.g., power supply) 450, and an over-current prevention unit 460.

Here, except for the power supply unit 450 and the over-current prevention unit 460, the organic light emitting display device 400 is substantially the same as the organic light emitting display device 300 that is described in reference to FIG. 8. Thus, duplicated descriptions may be omitted below.

The power supply unit 450 receives a power control signal CONT3 from the control unit 440. The power supply unit 450 includes two DC-DC converters 452 and 454 for generating driving voltages ELVDD and ELVSS that are used for an operation of the organic light emitting diode OLED. As illustrated in FIG. 11, the power supply unit 450 includes the first DC-DC converter 452 for generating the first driving voltage ELVDD, and the second DC-DC converter 454 for generating the second driving voltage ELVSS.

The over-current prevention unit 460 includes a first detection unit (e.g., first detector) 461, a second detection unit (e.g., second detector) 462, a first comparison unit 463, a second comparison unit 464, an OR-gate unit (e.g., OR-gate) 465, a block unit 466, and a reference set unit 467.

Here, except for the block unit 466, the over-current prevention unit 460 is substantially the same as the over-current prevention unit 360 that is described in reference to FIG. 8. Thus, duplicated descriptions may be omitted below.

The block unit 466 blocks supplies of the driving voltages ELVDD and ELVSS based on the comparison results that are generated by the first and second comparison units 463 and 464. The block unit 466 may block the supplies of the driving voltages ELVDD and ELVSS in response to a voltage block signal CS output from the OR-gate unit 465. The block unit 466 is located between the power supply unit 450 and the display panel 410. The block unit 466 is located on supply-lines of the driving voltages ELVDD and ELVSS that are provided to the display panel 410. The block unit 466 blocks the supplies of the driving voltages ELVDD and ELVSS by shutting-off (i.e., open-circuiting) the supply-lines of the driving voltages ELVDD and ELVSS. The supply-line of the first driving voltage ELVDD is different from the supply-line of the second driving voltage ELVSS. Hence, the block unit 466 is located on the supply-line of the first driving voltage ELVDD and the supply-line of the second driving voltage ELVSS. Thus, the block unit 466 shuts-off the supply-line of the first driving voltage ELVDD and the supply-line of the second driving voltage ELVSS. The block unit 466 may be a switching element (e.g., switch) having three-electrode-structure that uses the voltage block signal CS as a control signal. The switching element may be a MOSFET.

Figure 13:
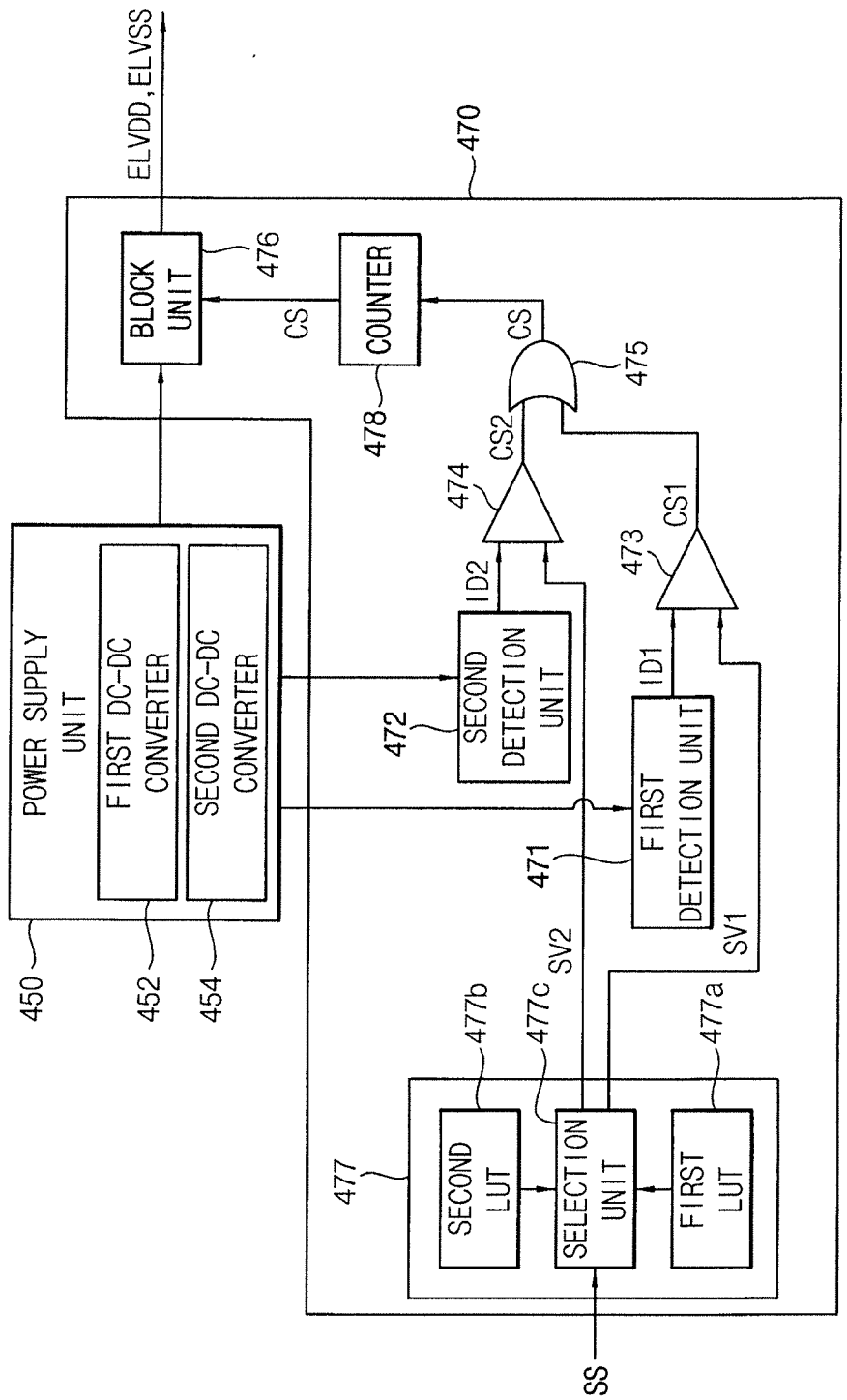
FIG. 13 is a block diagram illustrating another example of an over-current prevention unit in FIG. 11.

FIG. 13 is a block diagram illustrating another example of an over-current prevention unit in FIG. 11.

Referring to FIGS. 11 and 13, the over-current prevention unit 470 may include a first detection unit (e.g., first detector) 471, a second detection unit (e.g., second detector) 472, a first comparison unit 473, a second comparison unit 474, an OR-gate unit (e.g., OR-gate) 475, a block unit 476, a reference set unit 477, and a counter 478.

Here, except for the counter 478, the over-current prevention unit 470 is substantially the same as the over-current prevention unit 460 that is described in reference to FIG. 12. Thus, duplicated descriptions may be omitted below.

The block unit 476 blocks supplies of the driving voltages ELVDD and ELVSS based on the comparison results that are generated by the first and second comparison units 473 and 474. The block unit 476 may block the supplies of the driving voltages ELVDD and ELVSS in response to the voltage block signal CS output from the OR-gate unit 475. Here, the block unit 476 does not receive the voltage block signal CS for blocking the supplies of the driving voltages ELVDD and ELVSS from the OR-gate unit 475 but from the counter 478.

The counter 478 is located between the OR-gate unit 475 and the block unit 476. The counter 478 counts the voltage block signal CS having a logic high level that is output from the OR-gate unit 475. The counter 478 counts the voltage block signal CS output from the OR-gate unit 475, and outputs a signal having a logic high level when a counted number is equal to a reference number (e.g., predetermined number). In example embodiments, the signal having a logic high level output from the counter 478 may be substantially the voltage block signal CS. Thus, the block unit 478 receives the voltage block signal CS when the voltage block signal CS is maintained during a reference time or time period (e.g., predetermined time), the voltage block signal CS being output from the OR-gate unit 475.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims and their equivalents. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims and their equivalents.

As described above, the organic light emitting display device may prevent an over-current from flowing between a power supply unit and a display panel by detecting a current flowing through a inductor of a DC-DC converter having the inductor and a switching element (e.g., switch), by comparing a value of the detected current with a reference value (e.g., predetermined reference value), by determining whether an over-current is caused on the basis of the comparison result, and by blocking supplies of driving voltages (i.e., ELVDD and ELVSS).

Therefore, the present inventive concept may be used so as to protect an organic light emitting diode by preventing an over-current flowing through a power supply unit and a display panel. In addition, the present inventive concept may be applied to an organic light emitting display device without any design modification regardless of a size of a display panel included in the organic light emitting display device because the present inventive concept can change the criterion of an over-current according to the size of the display panel included in the organic light emitting display device.

What is claimed is:

1. An organic light emitting display device comprising:
a display panel comprising an organic light emitting diode;
a power supply comprising a DC-DC converter configured to generate a driving voltage for the organic light emitting diode, and configured to provide the driving voltage to the display panel, the DC-DC converter comprising an inductor and a switch; and
an over-current prevention unit comprising:
a comparison unit configured to compare a value of a current flowing through the inductor with a reference value, and configured to generate a comparison result;
a detector coupled to an output terminal of the inductor, and configured to detect the current flowing through the inductor; and
a counter coupled to an output of the comparison unit, and configured to count a voltage block signal that is output from the comparison unit when the value of the current flowing through the inductor is greater than the reference value; and
a block unit configured to block supply of the driving voltage either based on the comparison result or when a counted number of the voltage block signal is equal to a reference number.

2. The device of claim 1, wherein the comparison unit corresponds to a comparator that is configured to output a signal having a logic high level or a logic low level based on the comparison result.

3. The device of claim 1, further comprising a controller configured to provide a power control signal to the power supply, the power control signal for allowing the supply of the driving voltage,
wherein the block unit is further configured to block the power control signal based on the comparison result, the block unit being located between the controller and the power supply.

4. The device of claim 1, wherein the block unit is further configured to shut-off a supply-line of the driving voltage based on the comparison result, the block unit being located between the power supply and the display panel.

5. The device of claim 1, wherein the over-current prevention unit further comprises a reference set unit configured to set the reference value.

6. The device of claim 5, wherein the reference set unit comprises:
a look-up table for storing a plurality of reference values that are suitable for a plurality of display panels, sizes of the display panels being different from one another; and
a selection unit configured to select and output one of the reference values.

7. The device of claim 6, wherein the selection unit is further configured to select one of the reference values based on a selection signal that is provided from outside.

8. The device of claim 1, wherein the counter is further configured to provide the voltage block signal to the block unit when the counted number is equal to the reference number, and wherein the counter is located between the comparison unit and the block unit.

9. The device of claim 8, wherein the counter is further configured to receive a count clock signal from outside, the count clock signal being used for controlling a count cycle.

10. The device of claim 1, further comprising:
a scan driver configured to provide a scan signal to the display panel;
a data driver configured to provide a data voltage to the display panel; and
a controller configured to provide a scan control signal to the scan driver, to provide a data control signal and a data signal to the data driver, and to provide a power control signal to the power supply.

11. An organic light emitting display device comprising:
a display panel comprising an organic light emitting diode;
a power supply comprising a first DC-DC converter configured to generate a first driving voltage for the organic light emitting diode and to provide the first driving voltage to the display panel, and a second DC-DC converter configured to generate a second driving voltage for the organic light emitting diode and to provide the second driving voltage to the display panel, the first DC-DC converter comprising a first inductor and a first switch, the second DC-DC converter comprising a second inductor and a second switch, the first driving voltage being different from the second driving voltage; and an over-current prevention unit configured to compare a value of a current flowing through the first inductor with a first reference value, to compare a value of a current flowing through the second inductor with a second reference value, and to block supplies of the first and second driving voltages when the value of the current flowing through the first inductor is greater than the first reference value, or when the value of the current flowing through the second inductor is greater than the second reference value, wherein the over-current prevention unit comprises a first detector directly coupled to an output terminal of the first inductor.

12. The device of claim 11, wherein the first detector is configured to detect current flowing through the first inductor, and the over-current prevention unit further comprises:
a second detector configured to detect the current flowing through the second inductor;
a first comparison unit configured to compare the value of the current flowing through the first inductor with the first reference value;
a second comparison unit configured to compare the value of the current flowing through the second inductor with the second reference value; and
a block unit configured to block supply of the first and second driving voltages based on comparison results generated by the first and second comparison units.

13. An organic light emitting display device comprising:
a display panel comprising an organic light emitting diode;
a power supply comprising a first DC-DC converter configured to generate a first driving voltage for the organic light emitting diode and to provide the first driving voltage to the display panel, and a second DC-DC converter configured to generate a second driving voltage for the organic light emitting diode and to provide the second driving voltage to the display panel, the first DC-DC converter comprising a first inductor and a first switch, the second DC-DC converter comprising a second inductor and a second switch, the first driving voltage being different from the second driving voltage; and
an over-current prevention unit configured to block supplies of the first and second driving voltages when a value of a current flowing through the first inductor is greater than a first reference value, or when a value of a current flowing through the second inductor is greater than a second reference value, wherein the over-current prevention unit comprises:
a first detector configured to detect the current flowing through the first inductor;
a second detector configured to detect the current flowing through the second inductor;
a first comparison unit configured to compare a value of the current flowing through the first inductor with the first reference value;
a second comparison unit configured to compare a value of the current flowing through the second inductor with the second reference value;
a block unit configured to block supply of the first and second driving voltages based on comparison results generated by the first and second comparison units; and
an OR-gate configured to perform an OR operation between the comparison result generated by the first comparison unit and the comparison result generated by the second comparison unit, the OR-gate being located between the first comparison unit and the second comparison unit.

14. The device of claim 13, wherein the over-current prevention unit further comprises:
a counter configured to count a voltage block signal that is output from the OR-gate, and to provide the voltage block signal to the block unit when a counted number is equal to a reference number, the voltage block signal being used for blocking the supply of the first and second driving voltages, the counter being located between the OR-gate and the block unit.

15. The device of claim 14, wherein the counter is configured to receive a count clock signal from outside, the count clock signal being used for controlling a count cycle.

16. The device of claim 12, further comprising a controller configured to provide a power control signal to the power supply, the power control signal being used for allowing the supply of the first and second driving voltages,
wherein the block unit is configured to block the power control signal based on the comparison results generated by the first and second comparison units, the block unit being located between the controller and the power supply.

17. The device of claim 12, wherein the over-current prevention unit further comprises:
a reference set unit configured to set the first reference value and the second reference value.

18. The device of claim 17, wherein the reference set unit comprises:
a first look-up table for storing a plurality of first reference voltages that are suitable for a plurality of display panels, sizes of the display panels being different from one another;
a second look-up table for storing a plurality of second reference voltages that are suitable for the display panels; and
a selection unit configured to select and output one of the first reference voltages and one of the second reference voltages.

* * * * *